United States Patent [19]
Roberts et al.

[11] Patent Number: 5,628,490
[45] Date of Patent: May 13, 1997

[54] CONTROL VALVE WITH PNEUMATIC ACTUATION

[75] Inventors: Daniel H. Roberts, Topeka; Vincent J. Boreas, Leawood; Charles A. Palmer, Overland Park, all of Kans.

[73] Assignee: Metcraft, Inc., Grandview, Mo.

[21] Appl. No.: 544,658

[22] Filed: Oct. 18, 1995

[51] Int. Cl.$^6$ ................................................ F16K 31/12
[52] U.S. Cl. .............................. 251/57; 251/73; 137/907
[58] Field of Search .............................. 251/57, 73, 65; 137/624.11, 907

[56] References Cited

U.S. PATENT DOCUMENTS

| | | | |
|---|---|---|---|
| 3,091,932 | 6/1963 | Webb | 251/57 X |
| 4,630,644 | 12/1986 | Hafner et al. | 251/57 X |
| 4,819,682 | 4/1989 | Van Marcke | 251/57 X |

*Primary Examiner*—Kevin Lee
*Attorney, Agent, or Firm*—Hovey, Williams, Timmons & Collins

[57] ABSTRACT

A retrofittable, manually-actuated control valve kit for use in controlling the flow of water from a lavatory tap includes a valve assembly and an actuator assembly. The valve assembly includes a valve movable between flow-blocking and flow-permitting positions, a spring for biasing the valve toward the flow-blocking position, and a valve opening mechanism for opening the valve against the force of the spring in the presence of a predetermined pneumatic pressure in the opening mechanism and for relieving the predetermined pressure to release the valve for movement to the flow-blocking position. The actuator assembly supplies pneumatic pressure to the opening mechanism of the valve assembly. The actuator assembly includes a tubular body including a cylindrical inner surface and presenting opposed first and second axial ends, wherein the first end is closed except for an orifice, and an elongated plunger including a first end provided with a piston head sized for receipt in the body in sealing engagement with the inner surface and a second end protruding beyond the second end of the body and accessible for manual operation. The plunger is movable in a first direction to create a positive pressure at the orifice, and in a second direction to create a negative pressure at the orifice. A hose connects the actuator assembly with the valve opening mechanism for conveying pneumatic pressure to the valve assembly so that manual actuation of the plunger creates a pneumatic pressure within the body that is conveyed to the valve assembly to open the valve.

8 Claims, 2 Drawing Sheets

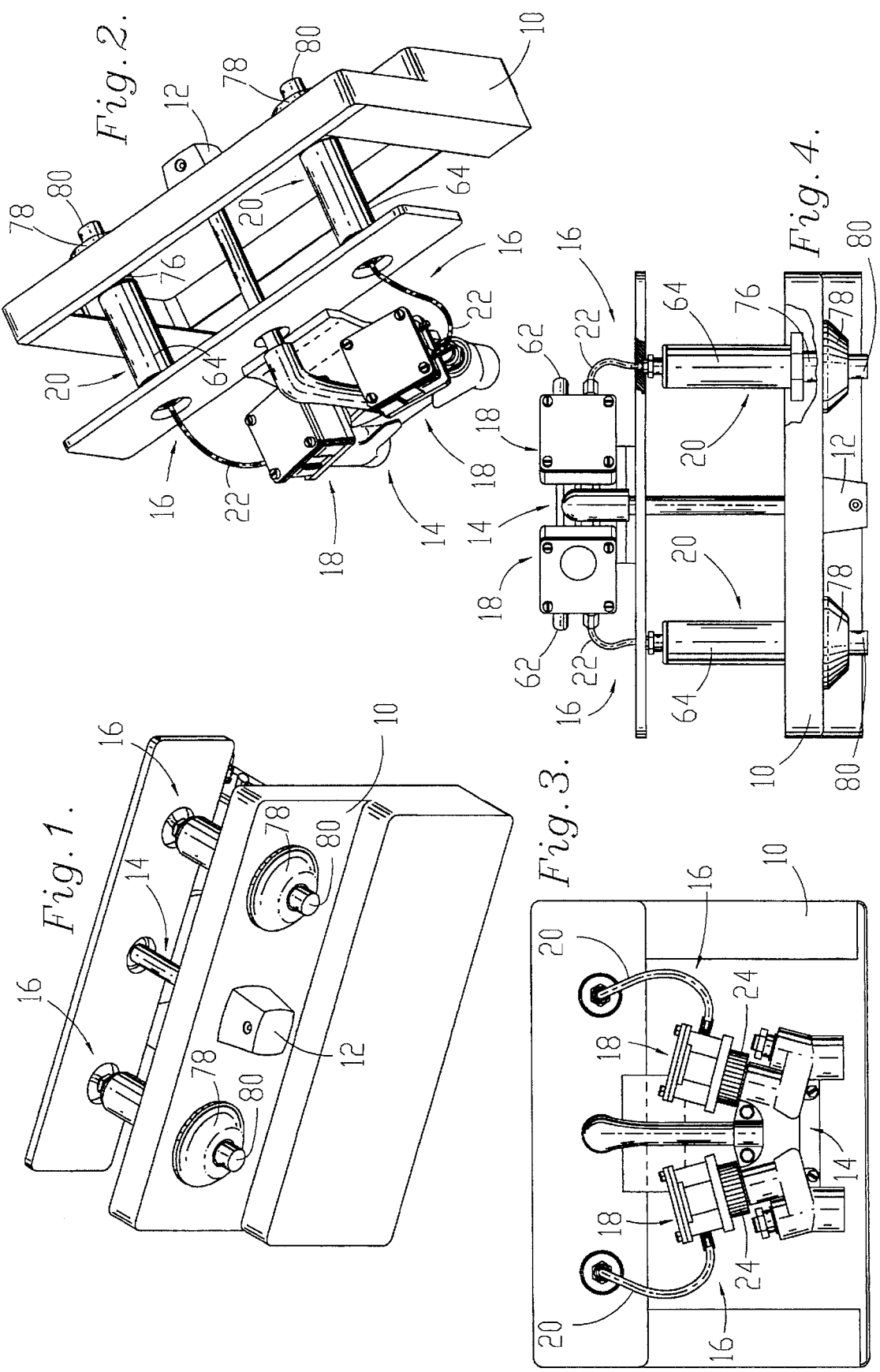

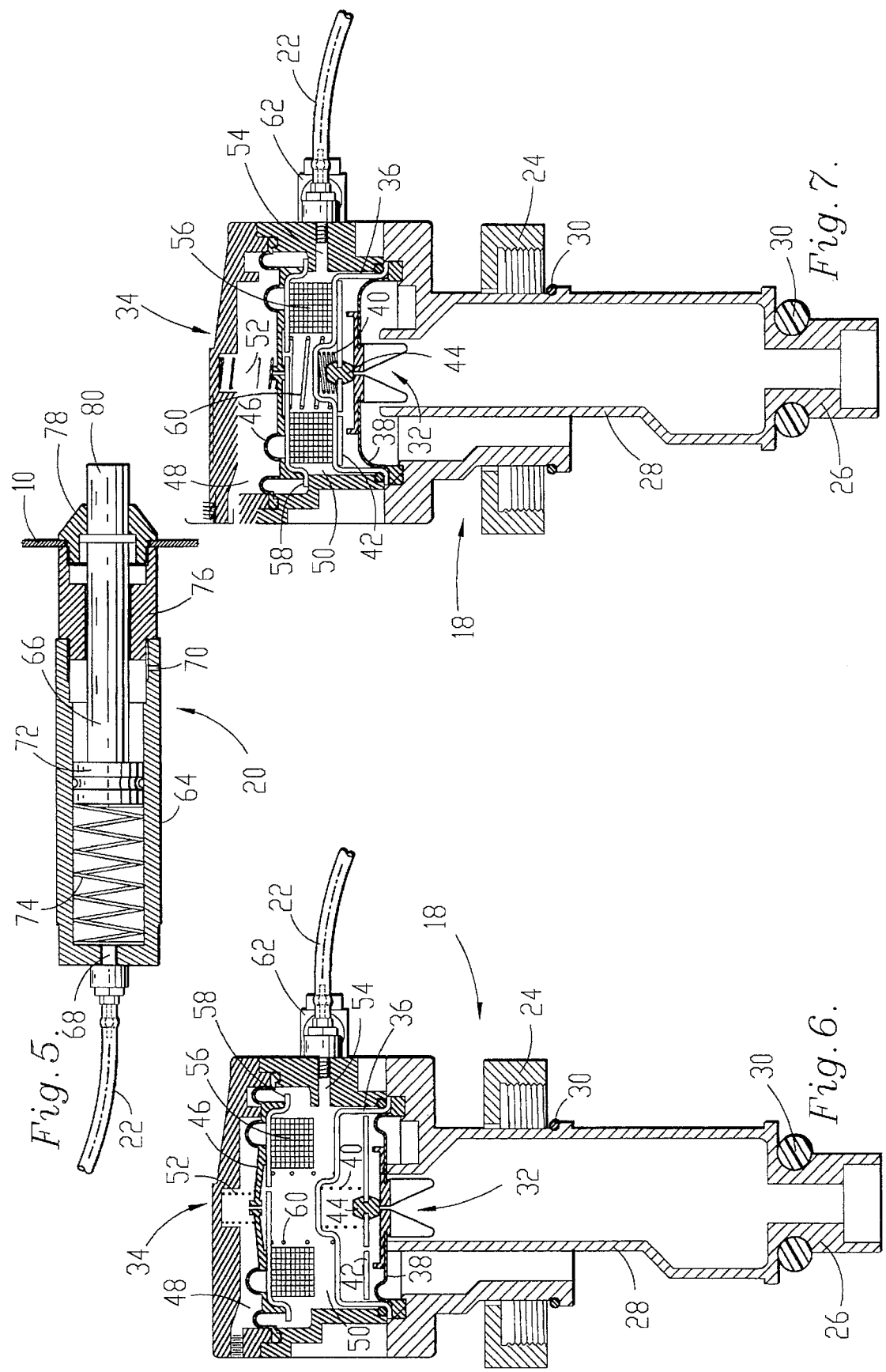

CONTROL VALVE WITH PNEUMATIC ACTUATION

BACKGROUND OF THE INVENTION

1. Field of the Invention

The present invention relates generally to fluid handling equipment and, more particularly, to a lavatory faucet having a manually-actuated push button control valve apparatus.

2. Discussion of the Prior Art

It is conventional to provide lavatories with manual push button hot and cold water controls. For example, in prison cells, a lavatory is provided which includes a wash bowl or basin and a splash guard fixture that is secured to the wall of the cell over one or more circular holes in the wall through which plumbing extends to the lavatory.

A typical prison lavatory includes mechanical valve assemblies in the hot and cold water plumbing for controlling the flow of water to a tap of the lavatory. Each valve assembly includes a valve movable between flow-blocking and flow-permitting positions, a spring for biasing the valve toward the flow-blocking position, and a mechanical valve opening mechanism for opening the valve against the force of the spring when a physical pressure is applied to one of push buttons. A delay mechanism is also provided in the valve assembly for keeping the water running for a predetermined time before the spring is allowed to move the valve back to the flow-blocking position.

The conventional lavatory also includes an actuator assembly for transmitting movement of the push buttons to the opening mechanism of the valve assembly. The actuator assembly includes a linkage having a first end received in one of the push buttons, and a second end connected to the opening mechanism of the valve assembly. The position on the linkage at which it is connected to the opening mechanism is adjustable to permit the apparatus to be installed in lavatories of varying dimensions.

Several problems arise with the use of such conventional valve apparatuses. For example, mechanical valve assembly has a much shorter useful life than is desirable for a device to be put in such a harsh environment as a prison cell where lavatories are subjected to heavy use and abuse. As a result, the valve apparatuses of known construction must be replaced frequently at a significant expense.

Another known type of valve apparatus includes a pneumatically actuated valve assembly, and an actuator assembly for supplying pneumatic pressure to the assembly. The actuator assembly includes a diaphragm housing, and an elongated rod extending into the housing for moving the diaphragm to create a pressure differential at the valve assembly.

Several problems arise from the use of a pneumatic lavatory of this type. For example, in the construction of prison cell lavatories, the size of the hole through the wall for the plumbing of the lavatory is made as small as possible, typically about four inches in diameter, to deter escape of prisoners. Thus, all of the plumbing for the lavatory, including the actuator assemblies for the hot and cold water, must fit within the hole while allowing access to the plumbing for installation and repair. The known pneumatic actuator is not suitable for such uses because the diaphragm housing and diaphragm present a diameter greater than two inches. Because the actuator assemblies for the hot and cold water are typically located near the top of the splash guard fixture above the basin, these assemblies are disposed adjacent the upper circumferential edge of the wall opening, and very little clearance is available to accommodate such large diameter actuators.

OBJECTS AND SUMMARY OF THE INVENTION

It is an object of the present invention to provide a manually actuated push button control valve apparatus that occupies very little space behind the splash guard of a lavatory, and presents a low profile which permits use of the apparatus in very restricted areas. It is another object of the invention to provide such an apparatus which possesses a long useful life requiring very little maintenance and infrequent replacement because of a sturdy construction.

A further object of the invention is to provide a pneumatic valve apparatus capable of being sold and installed as a retrofit kit in an existing lavatory without requiring any modification to the existing lavatory fixtures or plumbing. Thus, it is possible to replace a conventional mechanical valve apparatus with an improved pneumatic device in one simple operation involving the replacement of the mechanical valve and actuator assemblies with the pneumatic assemblies.

In accordance with these and other objects evident from the following description of a preferred embodiment of the invention, a manually actuated control valve apparatus is provided for use in controlling the flow of water from a lavatory tap. The apparatus includes a valve assembly, an actuator assembly, and a pneumatic line connected therebetween. The valve assembly includes a valve movable between flow-blocking and flow-permitting positions, a biasing means for biasing the valve toward the flow-blocking position, a valve opening means for opening the valve against the force of the biasing means in the presence of a predetermined pneumatic pressure in the opening means, and a means for relieving the predetermined pressure in the opening means to release the opening means for movement to the flow-blocking position.

The actuator assembly is provided for supplying pneumatic pressure to the opening means of the valve assembly, and includes a tubular actuator body including a cylindrical inner surface and presenting opposed first and second axial ends, the first end being closed except for an orifice, and an elongated plunger including a first end provided with a piston head sized for receipt in the body in sealing engagement with the inner surface and a second end protruding beyond the second end of the body and accessible for manual operation. The plunger is movable in a first direction to create a positive pressure at the orifice, and in a second direction to create a negative pressure at the orifice.

By providing a construction in accordance with the present invention, numerous advantages are realized. For example, by providing an actuator assembly incorporating a piston and cylinder arrangement, a relatively small-diameter profile is presented by the actuator assembly which permits it to be employed in very tight quarters such as those encountered in prison cell lavatories and the like. In addition, such piston and cylinder mechanisms are easier to install than conventional actuators, and can be used much longer than conventional diaphragm type actuators without wearing out or breaking down, and thus have a longer useful life than prior art devices.

Another advantage obtained through the use of the present invention resides in the capability of the valve and actuator assemblies to be installed as a retrofit kit in place of an existing mechanical valve. Thus, as a mechanical device wears out, a pneumatic apparatus can be installed in its place, providing all of the other advantages discussed above. Further, by employing the preferred apparatus, described more fully below, it is possible to install the kit simply by threading the valve assembly into the existing plumbing, and mounting the actuator assembly on the available lavatory fixtures.

BRIEF DESCRIPTION OF THE DRAWING FIGURES

The preferred embodiment of the invention is described in detail below with reference to the attached drawing figures, wherein:

FIG. 1 is a front perspective view of a lavatory including a splash guard fixture, a tap, and hot and cold control valve apparatuses constructed in accordance with the preferred embodiment;

FIG. 2 is a rear perspective view of the lavatory;

FIG. 3 is a rear elevational view of the lavatory;

FIG. 4 is a top plan view of the lavatory;

FIG. 5 is a sectional view of an actuator assembly forming a part of each control valve apparatus;

FIG. 6 is a sectional view of a valve assembly forming a part of each control valve apparatus, illustrating the assembly in a closed, flow-blocking position; and FIG. 7 is a sectional view of the valve assembly, illustrating the assembly in an open, flow-permitting position.

DETAILED DESCRIPTION OF A PREFERRED EMBODIMENT

A lavatory for use in a prison cell is shown in FIG. 1, and broadly includes a splash guard fixture 10 adapted to cover a hole in the cell wall, a tap 12 connected to plumbing 14 for supplying water to a bowl or basin underlying the splash guard, and a pair of retrofittable, manually actuated control valve apparatuses 16 for controlling the supply of hot and cold water to the tap. Although it is not necessary that the two control valve apparatuses be identical to one another, they are identical in the preferred embodiment and only one of the apparatuses is described in detail below.

The valve apparatuses 16 are illustrated in FIG. 2, and each broadly includes a valve assembly 18, an actuator assembly 20, and a pneumatic line 22 extending therebetween. The valve assembly 18 includes a construction that permits the assembly to be threaded onto the existing valve body of the lavatory in place of an existing prior art valve assembly. As shown in FIG. 6, the assembly 18 includes a depending cylindrical lower trunk sized for receipt within a threaded opening in the existing valve body, and an internally threaded collar 24 that is rotatable relative to the valve assembly for securing the valve assembly in place as shown in FIG. 3. The lower trunk of the assembly is divided into two longitudinal sections; an end section 26 that provides fluid communication between the plumbing inlet and the valve assembly; and an intermediate section 28 that provides fluid communication between the valve assembly and the plumbing outlet. Resilient O-rings 30 separate the two longitudinal sections from one another and from the remainder of the upper elements of the valve assembly, and prevent leakage.

The assembly 18 includes a valve 32 disposed within the fluid passage defined between the longitudinal sections 26, 28 of the assembly, and the valve is movable between a seated, closed position in which the flow of water to the tap is blocked, as shown in FIG. 6, and an unseated, open position in which water is allowed to flow from the tap, as shown in FIG. 7. In addition, the valve assembly 18 includes an upper pneumatic servomotor 34 defining an opening mechanism for moving the valve between the seated and unseated positions, and a cup element 36 separating the pneumatic servomotor from the valve, rendering the connection between the valve and servomotor fluid-tight.

The valve 32 is supported on a resilient diaphragm 38 and includes a central aperture providing communication between the valve outlet and the area above the valve upstream of the outlet. The diaphragm 38 includes a restricted orifice for providing fluid communication between the area above the valve and the inlet of the valve assembly so that the inlet pressure is allowed to equalize with the pressure above the valve. A spring 40 is provided above the valve and seats against a central domed portion of the cup 36 for biasing the valve and diaphragm toward the seated position. The spring 40 bears against an orifice plate 42 interposed between the diaphragm and the cup, and the orifice plate includes an orifice that provides communication between the opposite sides of the plate. In addition, the orifice plate includes a central plug 44 of rubber or the like aligned with the aperture of the diaphragm so that when the plate is biased against the diaphragm by the spring in the seated position of the valve, the plug blocks the central aperture in the diaphragm.

The servomotor 34 sits atop the cup 36, and includes a housing that is divided into upper and lower chambers 48, 50 by a resilient diaphragm 46. The upper chamber 48 communicates with atmosphere to permit unrestricted movement of the diaphragm within the upper chamber, and a compression spring 52 is provided for biasing the diaphragm toward the lower chamber. The diaphragm 46 includes a one-way check valve providing communication between the upper and lower chambers so that positive pressure in the lower chamber is relieved to atmosphere.

The lower chamber 50 extends between the diaphragm 46 and the cup element 36, and includes an inlet 54 by which the chamber communicates with the actuator assembly 20 via the pneumatic line 22. An annular magnet 56 is supported within the lower chamber on an inverted dish-shaped plate 58 that bears against the underside of the diaphragm so that the magnet and diaphragm move together within the servomotor. The central opening of the magnet is large enough to receive the domed portion of the cup element 36 as well as a compression spring 60 that is seated between the upper surface of the cup element and the plate 58.

With this construction of the valve assembly, a negative pressure applied at the inlet of the lower chamber will create a vacuum in the chamber that overcomes the biasing force of the spring 60 and draws the magnet 56, plate 58 and diaphragm 46 downward against the cup element 36 such that the magnet attracts the metal orifice plate 42 upward toward the cup element against the force of the spring 40. This movement of the orifice plate 42 unseats the plug 44 from the central aperture of the diaphragm 32, relieving the pressure above the diaphragm so that the pressure in the inlet lifts the diaphragm to the unseated position and allows flow through the valve assembly to the tap.

A needle valve 62 is illustrated in FIG. 4, and also communicates with the lower chamber of the servomotor. The needle valve functions as a delay means for maintaining the valve in the flow-permitting position for a predetermined length of time after the vacuum pressure has been applied before releasing the vacuum pressure to automatically move the valve to the flow-blocking position. The needle valve operates by bleeding off the vacuum pressure from the lower chamber so that the spring 60 returns the magnet to the raised position shown in FIG. 6, and the orifice plate 42 is biased against the valve 32 by the spring 40. When the plug 44 of the orifice plate seats against the diaphragm aperture, the pressure above the diaphragm becomes equalized with the inlet pressure so that the diaphragm is biased to the seated position by the spring, blocking the flow of water to the outlet.

The actuator assembly 20 is illustrated in FIG. 5, and broadly includes a tubular actuator body 64 and an elongated plunger 66. The body defines a pneumatic cylinder having a first end that is closed except for an outlet orifice 68, and a second end that is open for receiving the plunger. In addition, a radially extending vent 70 communicates with the interior of the body adjacent the second end so that the plunger can move back and forth within the body.

The plunger 66 includes a first end on which a piston head 72 is formed, the piston head having a diameter sized for receipt in the body in sealing engagement with the inner surface of the body. The end of the plunger opposite the piston head extends from the second end of the cylinder and is accessible so that the plunger can be manually shifted in a first direction to the left in FIG. 5, creating a positive pressure at the outlet orifice and in a second direction to the right in FIG. 5, creating a negative pressure at the outlet orifice. A compression spring 74 is provided in the body between the first end of the body and the piston head for biasing the plunger in the second direction.

A closure member 76 is received over the plunger and is secured to the second end of the cylinder, closing off the second end of the cylinder and supporting the plunger for linear shifting movement in the first and second directions. The closure member 76 is threaded externally at one end and internally at the other so that it can be threaded to the second end of the cylinder and to an escutcheon 78 that mounts the actuator assembly on the splash guard fixture 10 of the lavatory. If the free end of the closure member does not mate with an existing lavatory fixture, an intermediate adaptor can be provided for connecting the cylinder and fixture together. One end of the adaptor is configured for attachment to the closure member, and the other end is configured for attachment to the fixture.

The escutcheon 78 includes a central aperture aligned with the axis of the plunger, and a push button 80 is supported within the aperture in engagement with the plunger. Thus, when the push button is depressed it bears against and shifts the plunger in the first direction creating a positive pressure at the outlet orifice. Thereafter, when the push button is released, the plunger moves in the second direction under the force of the compression spring, creating a negative pressure at the outlet orifice.

The cylinder is long enough to accommodate a stroke of two or more inches by the plunger even though the operating stroke is only about one-half an inch. In this manner, a means is provided for allowing the actuator assembly to be fitted into almost any existing space behind the lavatory splash plate without requiring modification of the apparatus. After installation, to get water from the tap, a user depresses the push button 80 of the escutcheon 78, shifting the plunger 66 in the first direction to create a positive pressure at the outlet orifice 68 of the actuator assembly 20. This positive pressure is forced through the lower chamber 50 of the valve assembly 18 and from the assembly through the check valve in the diaphragm 46, being relieved to atmosphere. When the push button 80 is released, the plunger 66 is moved in the second direction by the spring 60, creating a negative pressure at the outlet orifice 68 of the actuator assembly. This negative pressure, when applied to the lower chamber 50 of the valve assembly 18, draws the magnet 56 to the position shown in FIG. 7, opening the valve in the manner described above. As long as the vacuum pressure remains in the lower chamber of the servomotor, water will flow from the tap. However, by adjusting the needle valve 62 it is possible to adjust the length of time during which water flows, and as air is allowed back into the lower chamber 50 through the needle valve, the spring 60 eventually overcomes the vacuum pressure to lift the magnet 56 from the cup element 36, allowing the valve 32 to return to the seated position shown in FIG. 6. Thus, each time the push button is depressed and released, water flows from the tap for a predetermined length of time, and the push button must be re-depressed to get more water.

Although the valve assembly is illustrated as being opened by a negative pressure, it is also possible to employ a servomotor that opens the valve in response to a positive pressure. Thus, the invention is not limited to the particular valve assembly shown, although the illustrated valve assembly does provide advantages over other prior art valve assemblies in that it can easily be retro-fitted on existing plumbing without requiring any modification to the plumbing.

The piston and cylinder arrangement defined by the body and plunger presents a low profile of about one inch such that the actuator assembly can be arranged behind the splash guard fixture within the hole in the wall of the cell without consuming a significant amount of room and without protruding radially beyond the fixture. In addition, the elements forming the actuator assembly can be formed exclusively of metal parts having an extended life relative to the resilient diaphragm elements employed in the conventional device described above.

Although the present invention has been described with reference to the preferred embodiment illustrated in the attached drawing figures, it is noted that substitutions may be made and equivalents employed herein without departing from the scope of the invention as recited in the claims.

What is claimed is:

1. A manually actuated control valve apparatus for use in controlling the flow of water from a lavatory tap, the apparatus comprising:

a valve assembly including a valve movable between flow-blocking and flow-permitting positions, a biasing means for biasing the valve toward the flow-blocking position, a valve opening means for opening the valve against the force of the biasing means in the presence of a predetermined pneumatic pressure in the opening means, and a means for relieving the predetermined pressure in the opening means to release the valve for movement to the flow-blocking position;

an actuator assembly for supplying pneumatic pressure to the opening means of the valve assembly, the actuator assembly including
a tubular actuator body including a cylindrical inner surface and presenting opposed first and second axial ends, the first end being closed except for an orifice,
an elongated plunger including a first end provided with a piston head sized for receipt in the body in sealing engagement with the inner surface and a second end protruding beyond the second end of the body and accessible for manual operation, the plunger being movable in a first direction to create a positive pressure at the orifice, and in a second direction to create a negative pressure at the orifice; and a hose connecting the orifice of the actuator assembly with the valve opening means for conveying pneumatic pressure to the valve assembly so that manual actuation of the plunger creates a pneumatic pressure within the body that is conveyed to the valve assembly to open the valve.

2. A control valve apparatus as recited in claim 1, wherein the actuator assembly includes a means for mounting the actuator body in a position that is fixed relative to the tap with the second end of the plunger accessible for manual push-button actuation that moves the plunger in the first direction.

3. A control valve apparatus as recited in claim 2, wherein the actuator assembly includes a biasing means disposed in the body between the first end of the body and the piston head of the plunger for biasing the plunger in the second direction opposite the direction of manual actuation.

4. A control valve apparatus as recited in claim 3, wherein the mounting means includes an adaptor secured to the second end of the body and supporting the plunger for movement in the first and second directions, and an escutcheon connected to the adaptor and covering the second end of the plunger, the escutcheon including a push-button that engages the second end of the plunger so that when the push-button is depressed, the plunger is moved in the first direction relative to the body.

5. A control valve apparatus as recited in claim 1, wherein the valve assembly includes a delay means for maintaining the valve in the flow-permitting position for a predetermined length of time after operation of the actuator assembly before automatically moving the valve to the flow-blocking position.

6. A control valve apparatus as recited in claim 1, wherein the predetermined pneumatic pressure for opening the valve against the force of the biasing means is a vacuum pressure.

7. A control valve apparatus as recited in claim 6, wherein the valve assembly includes a delay means for maintaining the valve in the flow-permitting position for a predetermined length of time after operation of the actuator assembly before releasing the vacuum pressure to automatically move the valve to the flow-blocking position.

8. A control valve apparatus as recited in claim 7, wherein the delay means includes a needle valve for bleeding off the vacuum pressure from the opening means so that the biasing means returns the valve to the flow-blocking position as the vacuum pressure is relieved.

* * * * *